(12) United States Patent
DeCusatis et al.

(10) Patent No.: US 9,536,119 B2
(45) Date of Patent: *Jan. 3, 2017

(54) NETWORK CABLE TRACKING SYSTEM

(71) Applicant: International Business Machines Corporation, Armonk, NY (US)

(72) Inventors: Casimer M. DeCusatis, Poughkeepsie, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/104,023

(22) Filed: Dec. 12, 2013

(65) Prior Publication Data

US 2015/0170483 A1    Jun. 18, 2015

(51) Int. Cl.
*G06K 7/10* (2006.01)
*H04L 12/24* (2006.01)

(52) U.S. Cl.
CPC ........... *G06K 7/10158* (2013.01); *H04L 41/12* (2013.01); *H04L 41/24* (2013.01)

(58) Field of Classification Search
CPC .............. G07C 9/00111; G06K 19/07749; G06K 7/0008; G06K 17/00; G06K 19/0723; G02B 6/3895
See application file for complete search history.

(56) References Cited

U.S. PATENT DOCUMENTS

| | | |
|---|---|---|
| 6,002,331 A | 12/1999 | Laor |
| 6,784,802 B1 | 8/2004 | Stanescu |
| 6,968,994 B1 | 11/2005 | Smith |
| 7,180,627 B2 * | 2/2007 | Moylan ............... B65C 11/0215 235/462.45 |
| 7,323,991 B1 * | 1/2008 | Eckert ................. G07C 9/00111 235/382 |
| 7,526,582 B2 | 4/2009 | Best et al. |
| 7,772,975 B2 | 8/2010 | Downie et al. |
| 8,092,249 B2 | 1/2012 | German et al. |
| 8,113,867 B2 | 2/2012 | Shigemi et al. |

(Continued)

FOREIGN PATENT DOCUMENTS

CN        101080726 A        11/2007

OTHER PUBLICATIONS

Downie et al., "RFID Tag Readability for Tracking Fiber Optic Connections in Data Centers"; 2011 IEEE International Conference (Sep. 15-16, 2011); Published: IEEE 2011; pp. 230-235.

(Continued)

*Primary Examiner* — James Yang
(74) *Attorney, Agent, or Firm* — Cantor Colburn LLP; Steven Chiu

(57) ABSTRACT

Embodiments relate to a system and method of identifying a cable terminal plug and port on a computer system. An aspect includes a method having a step of positioning a cable plug adjacent to a computer port, the cable plug having a passive transponder. An RF signal is transmitted to the passive transponder. The passive transponder is activated with the RF signal. An identification signal is transmitted based on receiving the RF signal. It is determined that identification signal matches an identification value of the computer port.

9 Claims, 3 Drawing Sheets

(56) References Cited

U.S. PATENT DOCUMENTS

| | | |
|---|---|---|
| 8,144,012 B2 | 3/2012 | Fujita et al. |
| 2004/0118916 A1 | 6/2004 | He |
| 2006/0064526 A1 | 3/2006 | Smith et al. |
| 2006/0145859 A1* | 7/2006 | Posamentier ........ G06K 7/0008 340/572.7 |
| 2007/0247284 A1 | 10/2007 | Martin et al. |
| 2008/0100440 A1 | 5/2008 | Downie et al. |
| 2008/0133047 A1* | 6/2008 | Best .................... H01R 9/2475 700/215 |
| 2011/0008996 A1 | 1/2011 | Pinn et al. |
| 2011/0274437 A1* | 11/2011 | Jones ................... G02B 6/3895 398/141 |
| 2012/0045928 A1 | 2/2012 | Caveney et al. |
| 2012/0126949 A1 | 5/2012 | Downie et al. |
| 2012/0126950 A1 | 5/2012 | Downie et al. |
| 2012/0133490 A1 | 5/2012 | Downie et al. |
| 2012/0274452 A1* | 11/2012 | Chamarti ............... H04Q 1/138 340/10.5 |

OTHER PUBLICATIONS

U.S. Appl. No. 13/187,609, "Cable Identification," filed Jul. 21, 2011, 32 pages.
U.S. Appl. No. 13/351,450, "Mechanism and Method for RFID Cable Path Labeling Identification, and Memory," filed Jan. 17, 2012, 21 pages.
Final Office Action for U.S. Appl. No. 14/508,303 dated Oct. 7, 2014; 17 pages.
NonFinal Office Action for U.S. Appl. No. 14/508,303 dated Oct. 7, 2014; 22 pages.
Chinese Office Action dated Jun. 20, 2016; 9 pgs.

\* cited by examiner

NETWORK CABLE TRACKING SYSTEM

BACKGROUND

The present invention relates generally to a system for tracking cables, and more specifically, to a system for matching a cable terminal plug with a server port.

Modern high performance computer systems often involve the interconnections between printed circuit boards or individual servers that comprise the system. These types of interconnects can provide high performance and density—supporting hundreds and in some cases up to thousands of interconnection wires, operating at rates potentially greater than 1-10 Gbps. However, these interconnections are difficult to install, typically using either backplane-style boards that the interconnecting circuit boards plug into using backplane connectors, or cables. This results in the use of cable connectors (or backplane-style connectors) and bulk cable with wires or flex circuitry. It should be appreciated that a large computing system or supercomputer may involve a large number of interconnections with terminal plugs and ports arranged in a confined area. The installation of the interconnections involves properly identifying the corresponding ports for each end of the cable.

SUMMARY

Embodiments include a method and system for identifying a cable terminal plug and port on a computer system. An aspect includes a method having a step of positioning a cable plug adjacent to a computer port, the cable plug having a passive transponder. An RF signal is transmitted to the passive transponder. The passive transponder is activated with the RF signal. An identification signal is transmitted based on receiving the RF signal. It is determined that identification signal matches an identification value of the computer port.

Another aspect includes a system for identifying a cable terminal plug and a port on a computer. The system includes an active transponder configured to transmit an RF signal. A cable is provided having at least one terminal plug. A passive transponder is coupled to the cable terminal plug, the passive transponder configured to transmit an identification signal based on receiving the RF signal. An indicator is operably coupled to the active transponder, the indicator configured to emit a first light based on the identification signal matching an identification value of a port.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
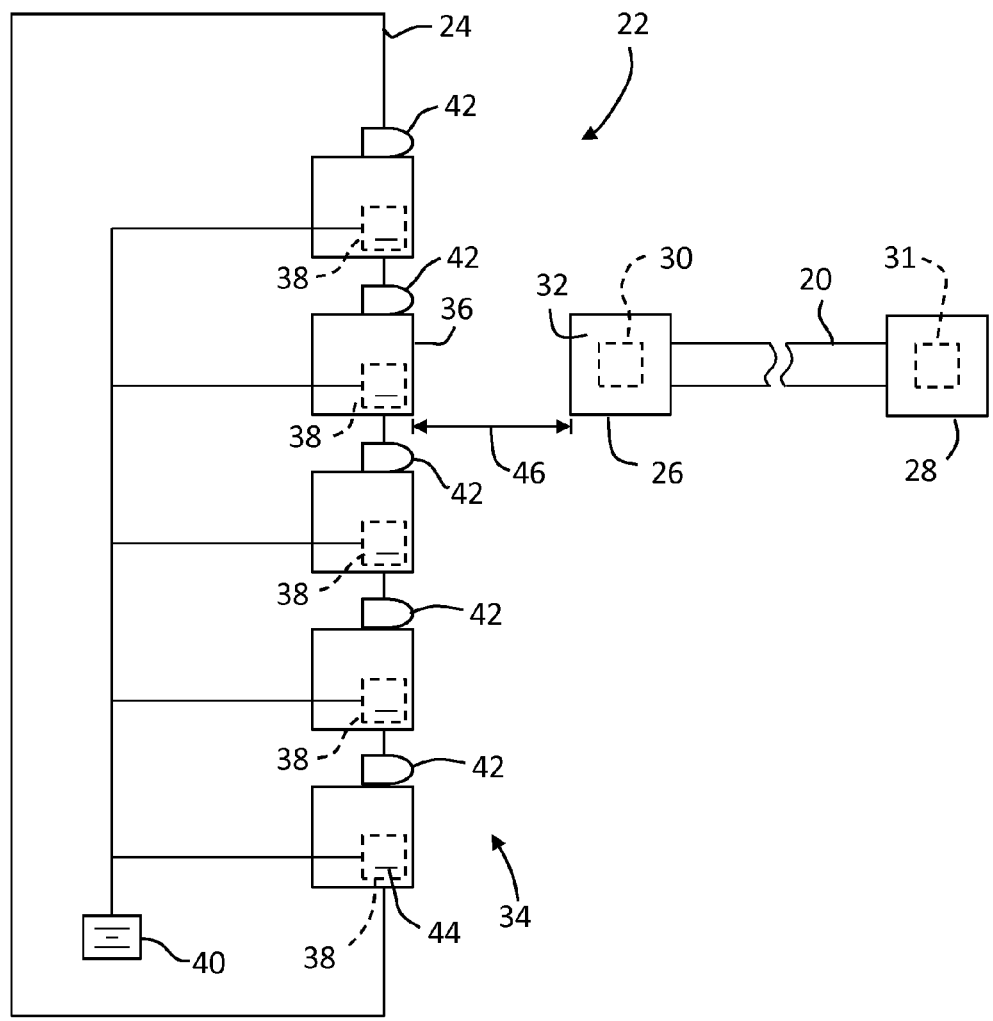
FIG. 1 depicts a schematic illustration of a system for identifying a cable and a port in accordance with an embodiment.

Embodiments of the disclosure may be used in connection with interconnection networks for computers, switches and other information technology equipment, such as high-density networks for large clustered systems, high-performance computing and supercomputing systems, and cloud computing systems, for example. Embodiments of the disclosure may be applied in the area of electrical backplanes or optical backplanes, arrays of cables, connector arrays, and cable harnesses that interconnect, e.g., dozens or hundreds of switching elements, also termed switches or switch ICs or switch chips.

Embodiments of the disclosure may be used in connection with so-called "all-to-all" or "full mesh" networks, in one or more levels, where a multiplicity of switching elements (on the order of 16 to 64 or 128 switching elements in some embodiments) each have links to most or all of the other switching elements. Such networks, with ports interconnecting each switching element or with a large number of other switching elements (i.e., "high-radix" switching elements) are only recently technically feasible and cost-effective. Previously, integrated circuit switching chips could only be cost-effectively constructed using commonly-available CMOS integrated circuit technology, with a moderate number (e.g., 8-24) of ports. Such "all-to-all" or "full mesh" networks may be used to avoid or mitigate against deficiencies, such as congestion and extra latency that may be inherent in Multi-stage Interconnection networks using other topologies, such as Torus (in 2, 3, 4, 5, 6, or more dimensions), or Omega (also called "Butterfly" or "Clos", or "Fat Tree") topologies, where traffic must traverse several intermediate switching elements to traverse the network.

While all-to-all or full-mesh networks may have advantages over other network topologies in terms of performance, routing simplicity, and robustness against link failures, they might have several disadvantages or deficiencies. Such deficiencies may include one or more of: (a) each switching element must support a large number of ports, which must be tightly-packed, requiring high-density connector packing, (b) the network requires a large number (on the order of n2) of interconnecting cables, and (c) the interconnecting cables form a complex topology, since the links connecting to each of the switching elements are "shuffled" and distributed across all of the other switching elements.

In order to address or alleviate one or more of the aforementioned deficiencies, embodiments of the disclosure may be used to simplify the construction and manufacturing of such all-to-all interconnection networks. In some embodiments, a generic decomposition of a single all-to-all interconnection network topology into a multiplicity of smaller all-to-all interconnection network elements may be provided, which can be replicated in a modular fashion, to construct the full topology. In this manner, an all-to-all topology may be broken down into units that can be replicated, where each unit may be larger or include more connections than a base-unit of a wire.

In the specific illustrative instance of optical networks with even numbers of drawers or books or blades, each containing a multiple of four (4) switching elements, use of multiple "shuffle cables" may be provided, where each shuffle cable may implement a 4×4 all-to-all topology, with a link width of one (1) or more fibers per link direction. Embodiments may include a topology with a drawer that contains eight (8) switching elements, and each link encompasses (6+6) fibers (i.e., six (6) fibers in each of the two directions), which implies that the entire structure may incorporate a modular aggregation of twenty-four (24) shuffle cables, with each shuffle cable implementing a 4×4× (6+6) all-to-all topology, incorporating one-hundred ninety-two (192) separate optical fibers or waveguides channels. Since each of the twenty-four (24) shuffle cables incorporates four (4) connectors on each of the two (2) ends, this complete optical backplane assembly may incorporate a total of one-hundred ninety-two (192) connectors, each of which may be a 48-fiber connector, using a standard "MT" or "MPO" Multi-fiber Push On/Pull Off optical connector design.

Embodiments of the disclosure may include one or more cables, such as a fiber optic cable 20 for example. A cable may be configured to convey multiple arrays of signals from multiple multi-fiber optical connectors associated with a first printed circuit board (PCB) to multiple multi-fiber optical connectors associated with a second or another PCB. It should be appreciated that while embodiments herein may refer to fiber optic cables, the claimed invention should not be so limited and embodiments may also be used with copper cables for example.

Referring now to FIG. 1, an exemplary system 22 is shown that assists the user with identifying a desired computer port in a printed circuit board or computer 24 having multiple ports adapted to receive a terminal plug 26 of cable 20. The cable 20 includes at least the first terminal plug 26 on one end. The terminal plug 26 is sized and shaped to be received into the ports of computer 24. In one embodiment, the cable 20 further includes a second terminal plug 28 arranged on an opposite end from the first terminal plug 26. The second terminal plug 28 may also have a passive transducer 31. As discussed above, the cable 20 may include either fiber optic media or copper media for transmitting signals there through. The cable 20 may be similar to that described in U.S. Pat. No. 8,559,781 entitled "Removable Sleeve for Fiber Optic Connectors for High Density Applications" filed on Nov. 6, 2009, which is incorporated herein by reference.

The terminal plug 26 includes a passive transponder 30. The passive transponder 30 may be integrated into the body 32 of the terminal plug 26. In one embodiment, the passive transponder 30 is coupled to the surface of the body 32, such as with an adhesive for example. This provides advantages in allowing embodiments to be used with existing cables. The passive transponder 30 is configured to be activated by electromagnetic induction in response to a radio frequency (RF) signal. Upon activation, the passive transponder 30 transmits an identification signal (via electromagnetic radiation). In the exemplary embodiment, the passive transponder 30 is configured to transmit a 16-32 bit identification signal. In one embodiment, the passive transponder 30 may be field programmable (re-writable) with a serial number or identification parameter that is transmitted in the identification signal. In some embodiments, the passive transponder 30 may be configured to have at least two modules: an integrated circuit for storing and processing information, modulating and demodulating RF signal, collecting DC power from the incident reader signal; and an antenna for receiving and transmitting the identification signal. In one embodiment, the second terminal plug 28 may also have a passive transponder 31.

The computer 24 includes a plurality of ports 34, the ports 34 being substantially identical and configured to receive the terminal plug 26. In the exemplary embodiment, the computer 24 is configured to couple with the terminal plug 26 at a designated port 36. Each of the ports 34 includes an active transponder 38 that is coupled to a power source 40. In one embodiment, the power source 40 is a broadband RF source. The active transponder 38 is configured to transmit a radio frequency signal and includes a transmitter circuit, a reader circuit, and an antenna 44. The transmitter or the reader circuit may include an integrated circuit that is configured for storing and processing information, and modulating/demodulating the RF signal. In the exemplary embodiment, the antenna 44 is short in length, meaning that it is configured to receive a signal from a source 2-4 centimeters from the active transponder 38. It should be appreciated that radio frequency signals when transmitted above a predetermined level or beyond the 2-4 centimeter range can interfere with the operation of the computer 24. It has been found that conventional radio frequency identification (RFID) tags produce signals at too high an energy level and could cause undesired interference with the computer 24. In one embodiment, the RF power threshold output by the active transponder 38 is on the order of tens of a mW. In the exemplary embodiment, the RF signal transmitted by the active transponder 38 and the passive transponder 30 may be a low frequency (120-150 kHz) or in another embodiment a high frequency (up to 13.56 MHz).

Each port 34 further includes an indicator 42, such as a light emitting diode for example. The indicator 42 is operably coupled to the active transponder 38 and is configured to emit a light when a terminal plug 26 is brought within a range 46 of the antenna 44. In the exemplary embodiment, the indicator 42 is configured to emit a red light when the terminal plug's identification signal does not match a predetermined identification value of the port 36, and emit a green light when the identification signal matches the identification value.

It should be appreciated that while the indicator 42 is illustrated as being separate from the ports 34, this is for exemplary purposes and the claimed invention should not be so limited. In other embodiments, the indicator 24 may integrated into the port 34 or with the active transponder 38. In still other embodiments, the indicator 42 may be comprised of multiple LED's, each with a single color.

In operation, the user moves the terminal plug 26 within the range 46 of one of the ports 34. When the terminal plug 26 is within the range 46, the RF signal from the active transponder 38 is received by the passive transponder 30. The receipt of the RF signal activates the passive transponder 30 causing the passive transponder 30 to transmit an identification signal. The active transponder 38 receives the identification signal and compares the identification signal with the predetermined identification value of the particular port. When the identification signal and identification value match, the indicator 42 is activated to communicate (e.g. a green light) with the user that this particular port is a match for the cable 20. When the identification signal and the identification value do not match, the indicator 42 is activated to communicate (e.g. a red light) that the adjacent port is the incorrect port. In one embodiment, the indicator 42 does not emit a light when the identification signal and the identification value do not match.

Figure 2:
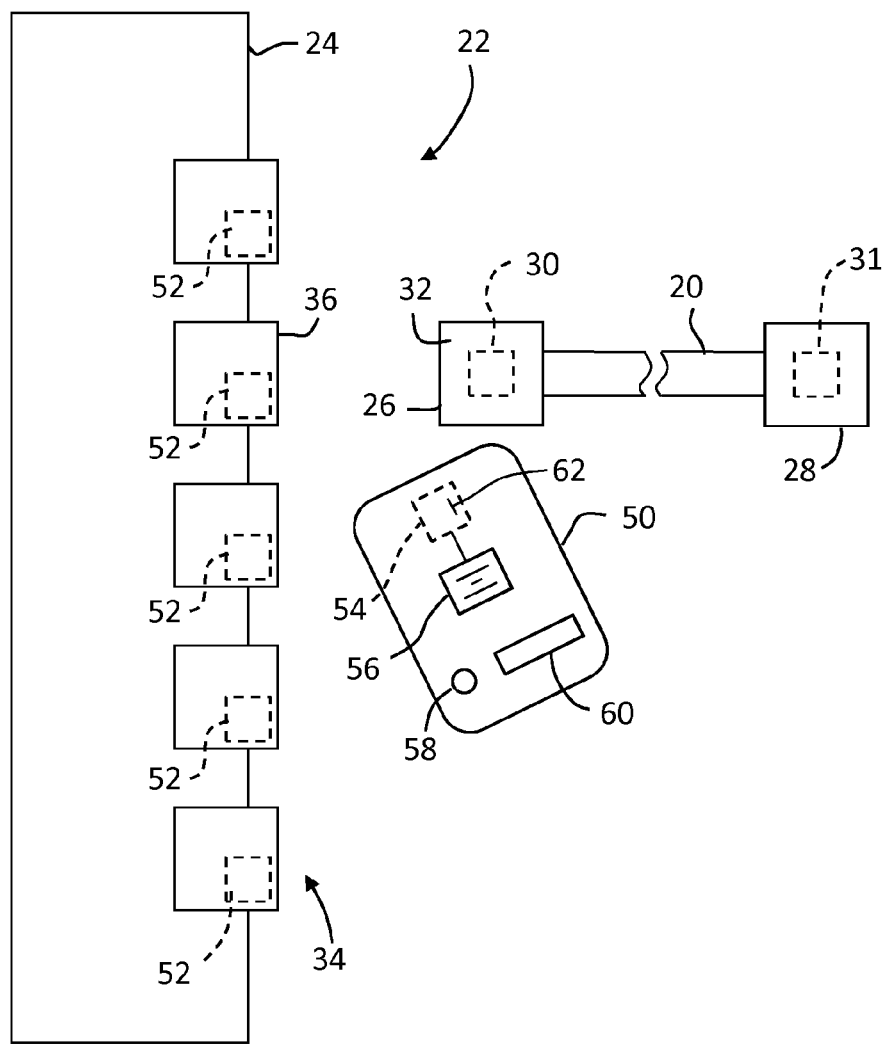
FIG. 2 depicts a schematic illustration of a system for identifying a cable and a port in accordance with another embodiment.

Turning now to FIG. 2, another embodiment of the system 22 is shown using a portable identification device 50. In this embodiment, the computer 24 includes a plurality of ports 34. Each of the ports 34 is sized and shaped to receive a terminal plug 26. As discussed above, the computer 24 is configured to receive signals from the cable 20 through only one of the ports 34, such as port 36 for example. Each of the ports 34 includes a transponder 52. In one embodiment, the transponder 52 is a passive transponder that transmits an identification signal in response to receiving an external RF signal. The cable 20 includes a terminal plug 26 having a passive transponder 30 that similarly transmits an identification signal in response to receiving an external signal.

In this embodiment, the portable device 50 includes an active transponder 54 that is coupled to a power source 56. The power source 56 may be a broadband RF source. Similar to that described above, the active transponder 54 includes an antenna 62 that is sized to receive an identification signal transmitted from a short distance (2-4 centimeters) from the device 50. The portable device 50 further includes an indicator 58 that is configured to emit a colored light. In one embodiment, the portable device 50 includes a display 60 that is configured to display the identification values received by the active transponder 54. It should be appreciated that while the illustrated embodiment discloses a passive transponder 52, in other embodiments an active transponder may be used.

In operation, the user first moves the portable device 50 within range of either the terminal plug 26 or one of the ports 34. The RF signal from the active transponder 54 activates the passive transponder 30, 52 and which transmits an identification signal in return. Once the identification signal is received by the active transponder 54, the user then moves the portable device 50 within range of the other passive transponder 30, 52. Once again, the RF signal from the portable device 50 activates the other passive transponder 30, 52 and receives an identification signal in return. If the two identification signals match, the indicator 42 is activated to communicate with the user that the scanned port is correct for the particular cable 20. In one embodiment, the user scans the passive transponder 30 of the cable 20 first, and then moves the portable device along the plurality of ports 34 until the indicator 58 illuminates to communicate that the correct port has been located.

It should be appreciated that the portable device 50 may also be used to identify each end of the cable 50. This could provide advantages in assisting the user in identifying a lengthy cable having remotely located ends.

Figure 3:
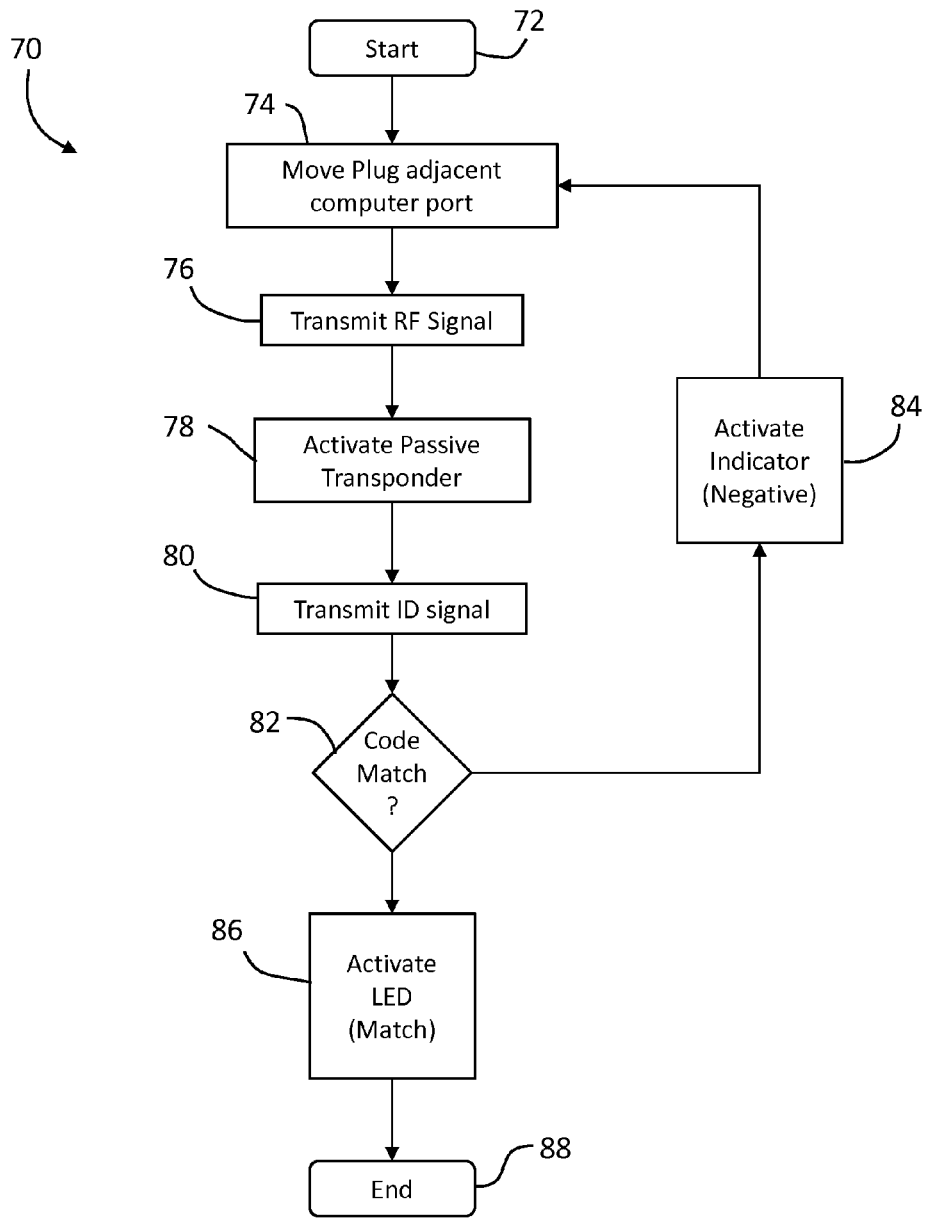
FIG. 3 depicts a process flow for identifying a cable and a port for a computer system in accordance with an embodiment.

Turning now to FIG. 3, a method 70 is shown for matching a cable 20 with the correct port 36 from among a plurality of ports 34 of computer 24. The method 70 starts at block 72 and proceeds to block 74 where the terminal plug 26 is moved adjacent to one of the computer ports 34 within the range 46. In the exemplary embodiment, the range 46 is 2-4 centimeters to decrease the risk of the RF signal from the active transponder 38 interfering with the operation of the computer 24. The method 70 then proceeds to block 76 where the active transponder 38 emits an RF signal which activates the passive transponder 30 in block 78. Once activated, the passive transponder 30 transmits an identification signal in block 80. Upon receiving the identification signal, the active transponder 38 compares in query block 82 the identification signal with an identification value of the computer port the active transponder 38 is associated with. If query block 82 returns a negative (the identification signal and the identification value do not match), then the method 70 proceeds to block 84 where the indicator 42 is activated to communicate a negative response. The method 70 then loops back to block 74 where the user moves the terminal plug 26 to another port and the process repeats.

If the query block 82 returns a positive (the identification signal and the identification value match), the method 70 proceeds to block 86 where the indicator 42 is activated to communicate to the user that this computer port is the correct computer port for cable 20. The user may then install the cable and method 70 terminates in block 88.

Technical effects and benefits include facilitating the identification of a desired computer port for interconnection with a particular cable.

As will be appreciated by one of average skill in the art, aspects of embodiments may be embodied as a system or a method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for identifying a cable terminal plug and a port on a computer, the system comprising:
    an active transponder configured to transmit an RF signal;
    a cable having a first terminal plug and a second terminal plug;
    a first passive transponder coupled to the cable first terminal plug, the first passive transponder configured to transmit a first identification signal based on receiving the RF signal;
    a second passive transponder coupled to the cable second terminal plug, the second passive transponder configured to transmit a second identification signal based on receiving the RF signal, the cable second terminal plug being coupled to the port;
    an indicator operably coupled to the active transponder;
    a portable device, wherein the active transponder and the indicator are arranged in the portable device, the portable device being movable relative to the computer, wherein the active transponder is configured to receive the first identification signal in response to the portable device being adjacent the first terminal plug and receive the second identification signal in response to the portable device being adjacent the second terminal plug, the first identification signal being received by the active transponder prior to the second identification signal, and wherein the indicator is configured to emit a first light based on the second identification signal matching the first identification signal and emit a second light when the port is an incorrect port, wherein the first light is a different color than the second light.

2. The system of claim 1 wherein the passive transponder is integrated into a body of the at least one terminal plug.

3. The system of claim 1 wherein the active transponder is configured to activate the first passive transponder based on the passive transponder being with 2-4 centimeters of the active transponder.

4. The system of claim 1 wherein the identification signal is between 16-32 bits.

5. The system of claim 1 further comprising a display operably coupled to the active transponder, the display configured to display the first identification and the second identification value received by the active transponder.

6. A system for identifying a cable terminal plug and a port on a computer, the system comprising:
    a portable device having an active transponder and an indicator, the active transponder configured to transmit a first RF signal and a second RF signal, the indicator operably coupled to the active transponder and configured to emit a first light based on a first identification signal received based on the first RF signal matching a second identification signal received based on the second RF signal and configured to emit a second light when a port is an incorrect port, wherein the first light is a different color than the second light;
    a cable having a first terminal plug at a first end and a second terminal plug at a second end;
    a first passive transponder coupled to the first cable terminal plug, the first passive transponder configured to transmit the first identification signal based on receiving the first RF signal; and
    a second passive transponder coupled to the second cable terminal plug, the second passive transponder configured to transmit the second identification signal based on receiving the second RF signal, the second cable terminal plug being coupled to the port.

7. The system of claim 1 further comprising a display operably coupled to the active transponder, the display configured to display identification values based on the active transponder receiving the first identification signal and the second identification signal.

8. The system of claim 7 wherein the active transponder is configured to activate the passive transponder based on the passive transponder being with 2-4 centimeters of the active transponder.

9. The system of claim 8 wherein the identification signal is between 16-32 bits.

* * * * *